March 3, 1970 W. K. ANTLE 3,497,944

DEVICES FOR VACUUM BRAZING

Filed April 28, 1967 2 Sheets-Sheet 1

INVENTOR.
WILLIAM K. ANTLE
BY Sam Laub
AGENT

INVENTOR.
WILLIAM K. ANTLE
BY Sam Laub
AGENT

United States Patent Office 3,497,944
Patented Mar. 3, 1970

3,497,944
DEVICES FOR VACUUM BRAZING

William K. Antle, Kent, Wash., assignor to The Boeing Company, Seattle, Wash., a corporation of Delaware Filed Apr. 28, 1967, Ser. No. 634,635
Int. Cl. B23k 35/12
U.S. Cl. 29—494 7 Claims

ABSTRACT OF THE DISCLOSURE

A method of bonding surfaces of members to establish atomically clean, impurity-free surfaces and bonds comprises (1) establishing a vacuum environment for the members for performing the subsequent steps, (2) depositing a joining material on the surfaces and (3) physsically contacting the surfaces through gravity means, bellows means or magnetic means. A vacuum brazing apparatus comprises vacuum chamber means with two openings, the chamber means being connected to a vacuum drawing means through one opening and the chamber means having a sealing means filling the other opening with the sealing means movably holding an evaporation filament means, said chamber means supporting two mounting means each capable of holding apart the surfaces of which are to be joined and said mounting means being capable of being moved into contact with each other.

BACKGROUND OF THE INVENTION

Field of the invention

This invention concerns methods and aparatuses capable of achieving evaporation and deposition of joining materials on two or more parts followed by joining of the two or more parts in a vacuum environment, the environment being maintained throughout the method, thus producing impurity-free bonds. In particular, this invention concerns apparatuses for performing junctions of the surfaces of at least two different parts in which apparatuses a vacuum is established and maintained for the subsequent steps, followed by the performance of an evaporation of a joining material enabling deposition of the joining material on the surfaces of said parts to be bonded and thereafter contacting the surfaces of said parts by a force generated by gravity means, bellows means or magnetic means.

The apparatuses and methods of the instant invention are particularly useful in the electronics industry where an impurity-free junction between two surfaces of two different parts is desired as an end product. An example of the foregoing is the formation of ultrasonic delay lines for electronics applications, the mounting of semi-conductor devices to their supporting bases or the mounting of solar cells to their supporting bases.

Description of the prior art

One way of bonding surfaces of two parts to each other in the past has been to use an organic cermet or a solder which is disposed between the surfaces of the two parts to be joined. Cermets or solvents often do not form good bonds of reliable properties because they do not dry out in the interior or possibly leave voids, discontinuities or other imperfections in the bond. Thermoplastics and thermosetting cermets are usually so viscous that they are not capable of establishing thin bonds. In addition, organic cermets do not match glass well acoustically and electronically and do not hold over wide range of temperature.

Methods of bonding and articles created thereby are set forth in U.S. Patent No. 2,754,238 which shows that it is known in the art to evaporate and deposit on the surfaces to be bonded a coat of a metal alloy in a vacuum environment, particularly of indium, gallium, thallium, or alloys thereof, then pressing the surfaces against each other in atmospheric conditions while heating at a temperature below the melting point of the coating. Such a process involves the steps of vapor deposition and subsequent bonding through diffusion promoted processes. It is desirable to achieve the assembly as well as evaporation and deposition in vacuum to prevent impurities entering the bond or oxidation of the bonding medium; this amounts to replacing the diffusion process of U.S. Patent No. 2,754,238 with new and novel vacuum welding methods and apparatuses.

Vacuum welding as currently practiced involves establishing atomically clean surfaces on each part to be vacuum welded, through using abrading means to remove all surface films, followed by achieving intimate contact between the parts, through using pressure to bring the parts in intimate contact. The resulting bond is a Van der Waals type bond of weak strength.

SUMMARY OF THE INVENTION

The requirements of industry, in particular the electronics industry, have created demand for apparatuses capable of having all of the steps necessary for bonding operations performed in total vacuum. Accordingly, this invention provides apparatuses and methods for joining two or more parts through a bonding medium in total vacuum resulting in an impurity-free, void-free, high-quality bond between these parts.

In light of the above, it is an object of the instant invention to provide an apparatus for bonding surfaces of material such as glasses, crystals, ceramics, metals and other solids capable of maintaining clean surfaces on the materials throughout all of the steps necessary for such bonding.

It is an additional object of the instant invention to provide a method of bonding surfaces of materials such as glasses, crystals, ceramics, metals or other solids in a vacuum, which is maintained throughout said method, through establishing a vacuum, vaporizing and depositing a joining medium on the bonding surfaces and thereafter contacting the surfaces.

It is an associated object of the instant invention to use the foregoing method and achieve the contacting step between the surfaces of the different parts to be joined by a gravity means, magnetic means or bellows means.

Other objects and many of the attendant advantages of the instant invention will be readily appreciated as the same becomes better understood by reference to the following detailed description, the appended claims and the accompanying drawings.

DESCRIPTION OF THE PREFERRED EMBODIMENTS

Figure 1:
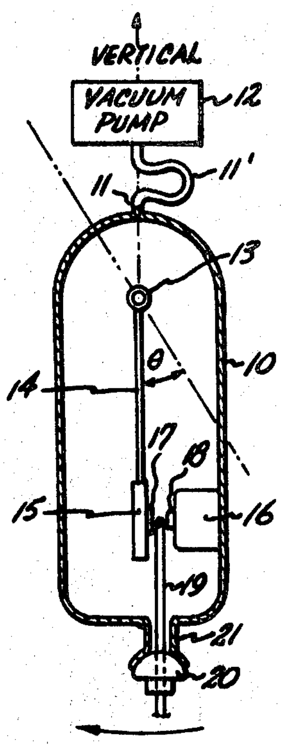
FIGURE 1 represents an apparatus for joining the surfaces of two parts through an evaporation step, and a vacuum brazing step involving the use of gravity for contacting the two surfaces to be joined.

In FIGURE 1, a chamber wall means 10, or container means 10, holds a vacuum which is achieved through inlet (opening) 11 and flexible joining means 11' by vacuum drawing means 12. Container means 10 is mounted on pivot 13 which is sealed into the chamber means 10 so that pivot 13 has attached thereto pendulum 14 with pendulum bob 15 connected to pendulum 14. Pendulum bob 15 serves as a mounting means for parts to be joined, such as part 17. Attached to container means 10 is a second mounting device 16 which holds a second part 18, the surface of which is to be joined to the surface of part 17. Initially, an evaporation filament 19 is inserted into container means 10 with swivel means 20 serving to block opening 21 in container means 10 while allowing evaporation filament means 19 to be between the parts 17 and 18 and then retracted. It is also envisioned that filament means 19 could be movably held in swivel means 20 enabling insertion and withdrawal of the filament means 19. Evaporation filament 19, a means for vaporizing a joining medium of which filament 19 is comprised or is coated with onto parts 17 and 18, is heated by an electrical current source means not shown in FIGURE 1. After sufficient heating of the evaporation filament produces a vapor which deposits in sufficient quantity on parts 17 and 18, the evaporation filament 19 is rotated away or drawn back a sufficient distance so that parts 17 and 18 may be brought physically in contact with each other. This contact is achieved in FIGURE 2 by turning the apparatus of FIGURE 1 in the direction shown by the arrow in FIGURE 1 so that gravity pulls on the pendulum bob bringing parts 17 and 18 into physical contact.

Figure 2:
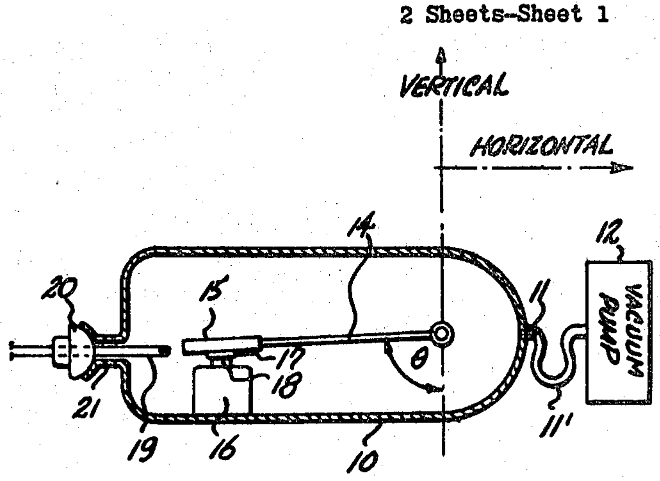
FIGURE 2 represents the apparatus of FIGURE 1 when the two parts are physically in contact.

The method of using the device set forth in FIGURES 1 and 2 involves the steps of drawing a vacuum and maintaining said vacuum throughout the entire method, vapor coating the surfaces of the parts to be joined, and thereafter establishing a physical contact between the parts to be joined by rotating the device so that gravity brings the parts into contact.

Figure 3:
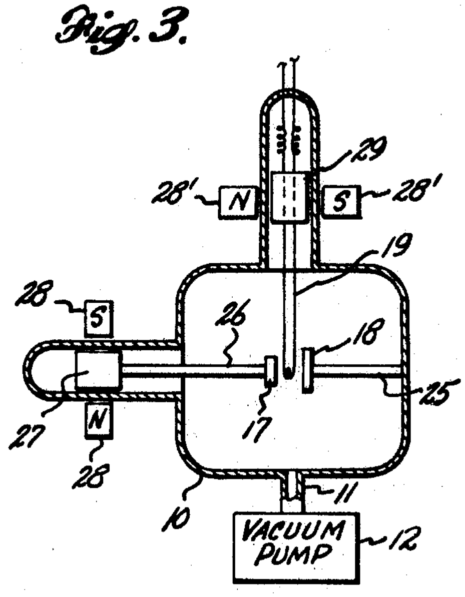
FIGURE 3 represents a similar apparatus to that of FIGURE 1 where magnetic means is used to achieve the contact between the two parts to be joined with FIGURE 4 showing the actual physical contact between these parts.
Figure 4:
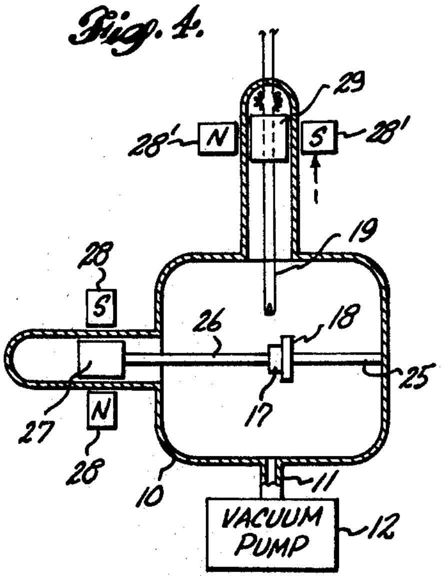

FIGURES 3 and 4 set forth another embodiment of the instant invention wherein container means 10 defines a vacuum with inlet (opening) 11 being connected to vacuum pump 12. Mounting means 25 is connected to container means 10 for stationary positioning of a part 18, the surface of which is to be joined with another part 17 mounted on another mounting means 26 which leads to magnetic slug 27, said slug being capable of relative movement in said container means 10 by moving magnetic means 28. The evaporation filament means 19 is held in place in magnetic slug 29 which is capable of being moved or rotated between parts 17 and 18 by moving magnetic means 28' and withdrawn from or rotated away from between parts 17 and 18 by moving magnetic means 28'. FIGURE 3 shows the arrangement whereby evaporation filament means 19 is depositing a vapor coating on parts 17 and 18 prior to joining of the parts. FIGURE 4 shows the same apparatus where filament 19 has been withdrawn from between parts 17 and 18 and parts 17 and 18 have been brought into physical contact.

The apparatus as embodied in FIGURES 3 and 4 can be operated by performing the steps of (a) drawing a vacuum and maintaining said vacuum through the subsequent steps of this method, (b) positioning an evaporation filament means between two parts, the surfaces of which are to be joined, (c) vapor depositing a joining medium on the surfaces of each of the parts to be joined, (d) withdrawing the filament from between said parts, and (e) contacting the parts by relative movement of magnetic means on which the parts are mounted.

Figure 5:
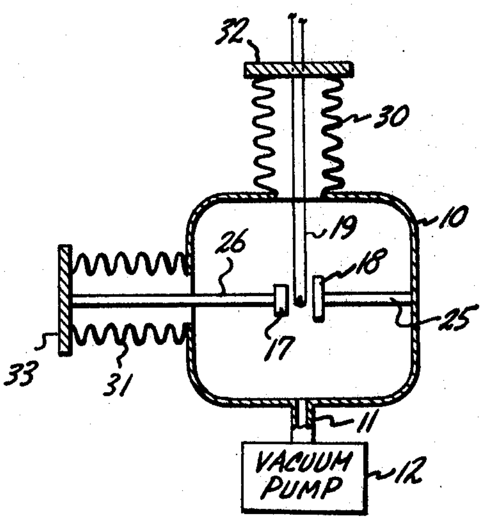
FIGURE 5 represents a similar apparatus to that of FIGURE 1 where bellows means is used to achieve the contact between the two parts to be joined with FIGURE 6 showing the actual physical contact between these parts.
Figure 6:
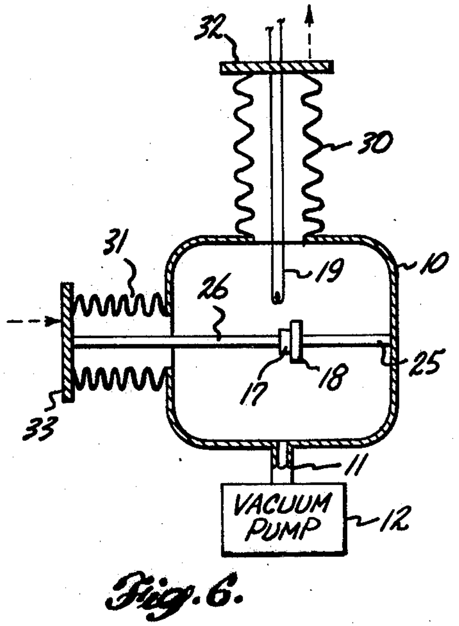

FIGURES 5 and 6 set forth a further embodiment of the instant invention whereby an apparatus uses bellows means 30 and 31 to achieve physical contact between the parts to be joined and movement of the filament means between and away from the parts. FIGURE 5 shows container means 10 holding a vacuum established through vacuum pump 12 which is connected with container means 10 through inlet 11. A stationary mounting means 25 attached to container means 10 holds a part 18, the surface of which is to be joined to another part 17 held in place on a rod 26 which is connected to bellows plate 33 with bellows means 31 capable of changing the relative place of rod 26 and correspondingly part 17. Another bellows means 30 has bellows plate 32 with a filament means 19 sealed into the bellows plate 32 so that the total assembly is capable of relative motion which intersperses the filament between the two parts 17 and 18. FIGURE 5 shows the chamber for vacuum brazing when the filament means 19 is inserted between the two parts to be joined such as during vaporization of the material of the filament onto the parts to be joined. FIGURE 6 shows the parts 17 and 18 in physical contact with each other with the filament means 19 withdrawn from between the parts.

The apparatus as embodied in FIGURES 5 and 6 can be operated by performing the method steps of (a) drawing a vacuum and maintaining said vacuum through the following steps, (b) positioning a filament means between the two parts, the surfaces of which are to be joined, (c) vapor depositing a joining medium on each of the surfaces to be joined, (d) withdrawing the filament from between said parts and (e) actuating the junction between said parts by moving bellows means thus achieving relative movement and contact between the parts.

Figure 7:
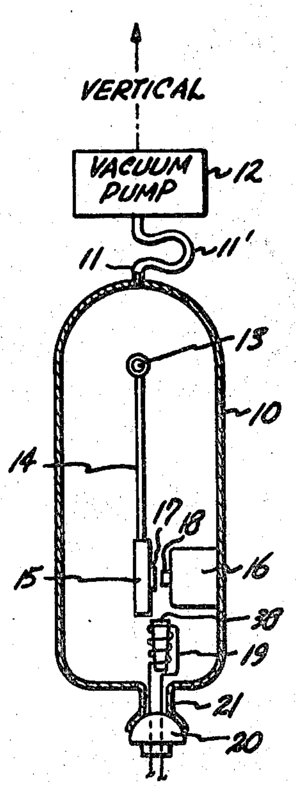
FIGURE 7 represents an apparatus having an electrically heated crucible holding the material to be evaporated and deposited on the parts to be joined.

FIGURE 7 shows the apparatus of FIGURE 1 wherein the filament heating means 19 is shaped to hold a crucible 38 of joining medium which is to be evaporated and deposited on parts 17 and 18.

In light of the foregoing discussion and embodiments, this invention teaches various means of practicing vacuum welding through vacuum welding apparatuses which enable the joining of parts in complete vacuum. In essence, the invention teaches a vacuum welding apparatus which has a vacuum chamber means capable of maintaining a vacuum in the defined area. The vacuum chamber means has two inlets, one of which is connected to a vacuum drawing means and the other is filled by a sealing means which seals the other inlet, the sealing means movably holding an evaporation filament means. The container means supports two mounting means capable of each holding a part, a surface of which is to be bonded, with one mounting means being stationary or movable while the other mounting means is capable of relative movement within the chamber means. The second mounting means capable of relative movement is connected to means for moving said second mounting means. The means for moving the second mounting means can be the pendulum means of FIGURES 1 and 2, the magnetic means and the magnetic slug means of FIGURES 3 and 4, and the bellows means of FIGURES 5 and 6. The apparatuses of the instant invention enable the practice of a method of bonding surfaces of two or more parts which method is capable of maintaining atomically clean, impurity-free surfaces and bonds comprising the steps of (1) establishing a vacuum environment on the surfaces and maintaining the vacuum environment throughout the method, (2) evaporating a thin coat of joining material on the surfaces by moving an evaporation filament means in proximity to the surfaces, and (3) moving the surfaces of the parts into physical contact with each other after removing the evaporation filament means from proximity to the surfaces. As seen from the above embodiments, the means for moving the evaporation filament in proximity to the surfaces can be manual means, magnetic means and bellows means. Further, the means for moving the surfaces into physical contact with each other can be a gravity pendulum means designed to utilize gravity as the contacting force, magnetic means actuated by movement of magnets, and bellows means capable of manual operation or mechanized operation.

The chamber walls of the above apparatuses can be fabricated of steel or glass as well as plastic materials and other metals and alloys. The sealing means and connecting means used in the above apparatuses can be typical rubber or vinyl seals. The mounting means can be any typical metal or plastic material with the mounting means adaptable to hold parts; I have found that holes being bored into the mounting means which are slightly less deep than the size of the part to be mounted serves as excellent ways of holding these parts during the joining operations. In addition, various types of clamping devices can be devised for holding these parts. The apparatuses and methods of the instant invention have been practiced using evaporation filaments of aluminum, gold, indium, thalium, gallium, and copper and combinations thereof as well as tungsten filaments coated with any of the foregoing materials. The evaporation operation is achieved by having an electric current flowing through the evaporation filament in such a manner as to cause a heating of the filament and dissipation as a vapor. Any number of suitable vacuum drawing means can be used to maintain the vacuum in the area defined by the chamber walls. It should be noted that none of these materials and components used are critical to the practice of the methods or assembly of the apparatuses of the instant invention. In fact the variety of materials and selection which can be used in making the above apparatuses serves as a further advantage of the instant invention.

I have bonded various types of materials using the above methods and apparatuses: glass to glass, metal alloy to metal alloy, metal to ceramic, and glass to ceramic and metals to alloys. I have found that the bonding contact time in the use of the above methods and apparatuses can be approximately 3 seconds to form a good bond strength.

The apparatuses and methods of the instant invention offer many advantages for the assembly of electronic components with impurity-free bonds and impurity-free surfaces. In particular, the high temperature solder mixtures of present methods are avoided with their impurities and unrealiability because of the changing properties of the components being joined due to the temperature of the soldering process. Further, the apparatuses of the instant invention are usually used by personnel because the methods practiced in using these apparatuses are relatively simple and readily understood by personnel. In addition, the apparatuses of the instant invention could be readily adapted into an assembly line pattern in the production of electronic parts.

The apparatuses of the instant invention have a minimal number of openings in the container means 10 which in turn minimizes the leakage of the apparatuses, enabling maintenance of a vacuum with less powerful vacuum pumps. This enables savings on initial equipment costs and savings on operation costs. This is to be contrasted with units having mechanical probes and tool inserts in the container means—with time these sealed openings develop vacuum leaks.

The apparatuses and methods enable maintenance of a vacuum environment throughout the welding of two parts together. In addition the instant invention represents a refinement in vacuum welding. This invention enables maintenance of atomically clean surfaces in the vapor deposition step; this is to be contrasted with current practice in vacuum welding of abrading away surface films on the parts to be joined by mechanical abrading tools. The abrasion technique is not efficient in removing surface films and can introduce gross surface discontinuities and impurities. In addition the bonds of the instant invention are superior in strength and properties over the Van der Waals bonds achieved by pressure bonding of abraded surfaces.

While I have described and illustrated some preferred forms of my invention, it should be understood that many modifications may be made without departing from the spirit and the scope of the invention, and it should, therefore, be understood that the invention is limited only by the scope of the appended claims.

I claim:

1. A method of joining the surfaces of members resulting in atomically clean, impurity-free bonds, said method comprising the steps of (a) establishing a vacuum environment on the members throughout the following steps, (b) moving an evaporation filament means in proximity to the members, (c) heating the evaporation filament means which causes vaporization and deposition of a joining medium on the members, (d) removing the evaporation filament means from proximity to the members, and (e) moving the members into physical contact with each other.

2. The method according to claim 1 wherein the evaporation filament means is manually moved in proximity to the members, and after completion of the evaporation step, manually removed from proximity to the members; and the surfaces are moved into physical contact by pendulum means utilizing gravity as the contacting force.

3. The method according to claim 1 wherein the evaporation filament means is moved in proximity to and removed from proximity to the members by magnetic slug means being responsive to relative movement of magnetic means, and the members are moved into physical contact by magnetic slug means being responsive to relative movement of magnetic means.

4. The method according to claim 1 wherein the evaporation filament means is moved in proximity to and removed from proximity to the members by bellows means and the members are moved into physical contact by bellows means.

5. A vacuum welding apparatus comprising, in combination, vacuum chamber means having two openings therein, the chamber means being connected to a vacuum drawing means through one of the openings, the chamber means having means for depositing a layer of joining medium sealing the other opening, the chamber means supporting a plurality of mounting means each capable of holding a member the surface of which is to be bonded to another member by the joining medium, and means for moving said plurality of mounting means so as to physically contact the members to each other, said moving means comprising a pivoted pendulum means, the pivot for the pendulum means also serving as support means for the vacuum chamber means and enabling the vacuum chamber means to be moved so that the members are brought into physical contact by the force of gravity.

6. A vacuum welding apparatus comprising, in combination, vacuum chamber means having two openings therein, the chamber means being connected to a vacuum drawing means through one of the openings, the chamber means having means for depositing a layer of joining medium sealing the other opening, the chamber means supporting a plurality of mounting means each capable of holding a member the surface of which is to be bonded to another member by the joining medium, and means for moving said plurality of mounting means so as to physically contact the members to each other, said moving means comprising magnetic means external to the vacuum chamber means, said magnetic means moving magnetic slug means which is connected to the plurality of mounting means.

7. A vacuum welding apparatus comprising, in combination, vacuum chamber means having two openings therein, the chamber means being connected to a vacuum drawing means through one of the openings, the chamber means having means for depositing a layer of joining medium sealing the other openings, the chamber means supporting a plurality of mounting means each capble of holding a member the surface of which is to be bonded to another member by the joining medium, and means for moving said plurality of mounting means so as to physically contact the members to each other, said moving means comprising a bellows means capable of manual operation.

References Cited

UNITED STATES PATENTS

| | | | |
|---|---|---|---|
| 2,995,475 | 8/1961 | Sharpless | 29—502 |
| 3,303,549 | 2/1967 | Peyser | 29—494 X |

FOREIGN PATENTS

| | | |
|---|---|---|
| 503,076 | 3/1939 | Germany. |

JOHN F. CAMPBELL, Primary Examiner

R. J. SHORE, Assistant Examiner

U.S. Cl. X.R.

29—502